United States Patent [19]
McInally

[11] 3,893,754
[45] July 8, 1975

[54] COMBINATION PARABOLOID-ELLIPSOID MIRROR SYSTEM

[75] Inventor: John A. McInally, Penfield, N.Y.

[73] Assignee: Xerox Corporation, Stamford, Conn.

[22] Filed: June 21, 1973

[21] Appl. No.: 372,435

[52] U.S. Cl. ............... 350/294; 350/288; 350/293
[51] Int. Cl. ............................................. G02b 5/10
[58] Field of Search ...... 350/288, 293, 294; 240/25, 240/41, 35, 41.37, 103

[56] References Cited
UNITED STATES PATENTS
3,774,995   11/1973   Perret ................................. 350/294

*Primary Examiner*—Alfred E. Smith
*Assistant Examiner*—Michael J. Tokar
*Attorney, Agent, or Firm*—Robert J. Bird

[57] ABSTRACT

A mirror system for imaging an object by reflection, in which the reflecting surfaces intermediate the object and image are partially paraboloidal and partially ellipsoidal.

3 Claims, 3 Drawing Figures

PATENTED JUL 8 1975　　　　　　　　　　　　　　3,893,754

COMBINATION PARABOLOID-ELLIPSOID MIRROR SYSTEM

BACKGROUND OF THE INVENTION

This invention relates to reflectors and their use in illumination and imaging.

In the prior art, ellipsoidal imaging mirrors are known in which an object or light source positioned at the first focal point is imaged by the mirror at the second focal point of the ellipsoid. Paraboloidal imaging mirrors are also known to the prior art, in which an object or light source positioned at the focal point of a first paraboloid reflector is imaged at the focal point of a second coaxial paraboloid reflector.

In the case of the ellipsoidal reflector, the generated image is diffuse or unresolved due to the different magnifications of images generated by different light rays. A magnification of 1:1 results when the incident light path is equal to the reflected light path. Where the incident light path is shorter than the reflected light path, magnification is greater than unity and where the incident light path is longer than the reflected light path, magnification is less than unity. As will be appreciated, the ratio of incident to reflected light path lengths varies continuously within the ellipsoidal mirror.

In the case of paraboloidal reflectors, light rays from the source that are extremely off-axis relative to the paraboloid create aberrations in the resulting image. This again contributes to making the image somewhat diffuse.

It is an object of this invention to provide a combination mirror imaging system which retains the desirable characteristics of ellipsoidal and paraboloidal mirror systems and at the same time largely avoids their respective shortcomings.

For a better understanding of this invention, reference is made to the following detailed description given in connection with the accompanying drawing.

DRAWING

DESCRIPTION

Figure 1:
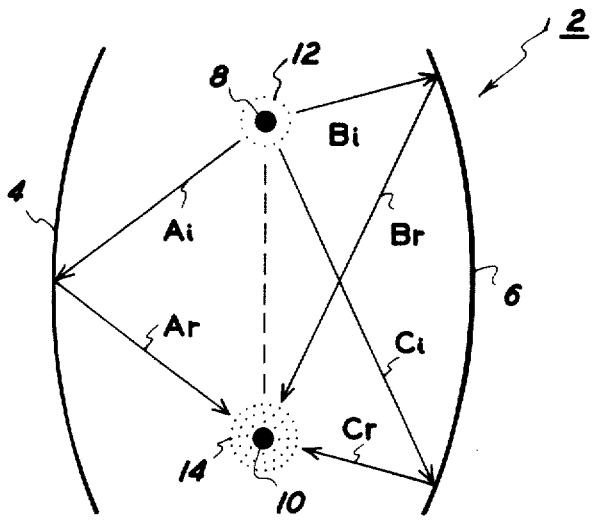
FIG. 1 is a schematic optical diagram of an ellipsoidal reflector, known to the prior art.

Referring now to FIG. 1, an ellipsoidal mirror is represented generally at 2 and includes first and second ellipsoidal reflector surfaces 4 and 6 which may or may not be connected but which are part of the same ellipsoid geometry. The first and second focal points of ellipsoid 2 are shown at 8 and 10, respectively, and together define the axis 16 of ellipsoid 2.

An extended object 12 positioned about the first focal point 8 is imaged at 14 about the second focal point 10 by the several light rays propagating from the object 12 to the image 14. Three imaging light rays are represented at A, B, and C. Light ray A includes an incident portion ($A_i$) and a reflected portion ($A_r$). Similarly rays B and C include incident and reflected portions $B_i$, $B_r$, $C_i$, and $C_r$. In the example shown, $A_i = A_r$ and thus the image of object 12 formed at 14 is equal in size to object 12. That is to say, the magnification is 1:1 when incident and reflected rays are equal. $B_i$ is smaller than $B_r$, and the image generated by ray B is magnified at greater than unity magnification. Conversely, $C_i$ is greater than $C_r$ and the image generated by ray C is de-magnified. The three rays A, B, C thus generate a diffuse image 14 represented by three dotted circles of different sizes.

Figure 2:
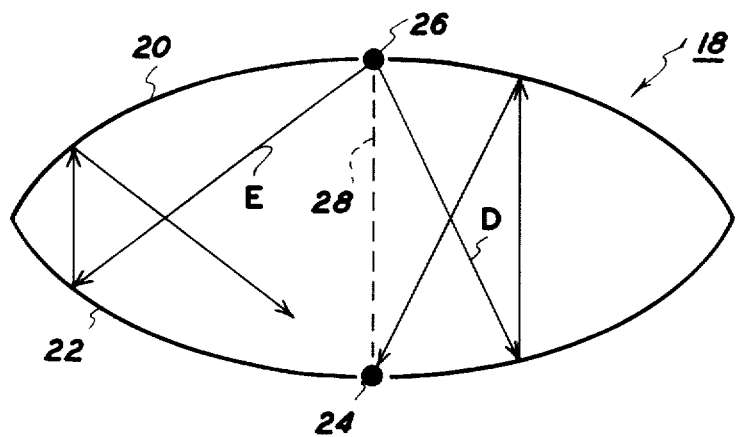
FIG. 2 is a schematic optical diagram of a paraboloidal reflector, also known to the prior art.

Referring now to FIG. 2, a paraboloidal mirror system is generally represented at 18 and includes a first paraboloidal mirror 20 coaxial with, and facing, a second paraboloidal mirror 22 on an axis 28. Point 24 is the focal point of paraboloid 20 and point 26 is the focal point of paraboloid 22. An object placed at point 26 is focused at point 24 as is known in the art. A light ray is represented at D and is shown reflecting from the two paraboloidal surfaces and propagating to image point 22. A second light ray propagating from object point 26 to image point 24 is shown at E. Ray E is an extreme off-axis ray, that is, it is at a relatively large angle with respect to the axis 28. Off-axis ray such as E create aberrations in the image at 24 in a paraboloidal system.

Figure 3:
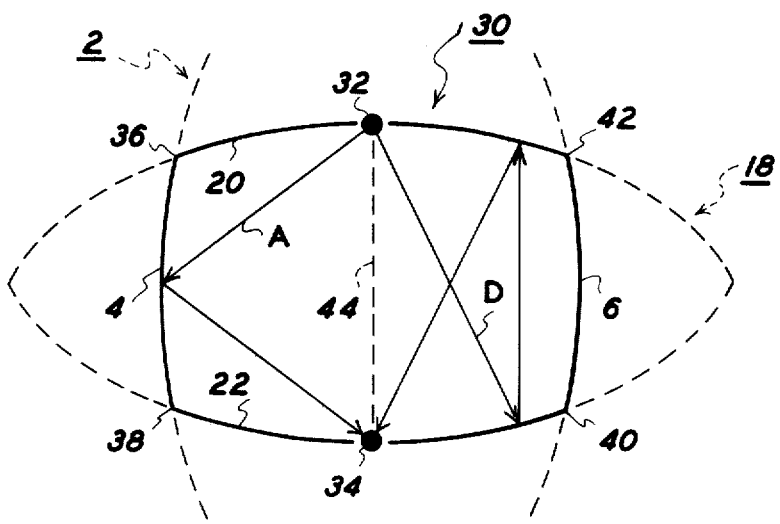
FIG. 3 is a schematic optical diagram of a combination ellipsoidal-paraboloidal reflector system according to this invention.

In FIG. 3, the geometries of FIGS. 1 and 2 are shown in superposition. That is, the ellipsoid 2 and the paraboloids 20 and 22 are combined in the ellipsoidal-paraboloidal reflector combination 30 of this invention. In the combination 30, point 32 is at both the first focal point of the ellipsoid 2 and the focal point of paraboloid 22. Similarly, point 34 is at both the second focal point of ellipsoid 2 and the focal point of paraboloid 20. In this arrangement, only a portion of the ellipsoidal surfaces 4 and 6 (from FIG. 1) are retained as "working" or reflecting surfaces. Specifically, that part of surface 4 between points 36 and 38 is retained as reflector surface and that part of surface 6 between points 40 and 42. This corresponds, with reference to FIG. 1, generally to that part of the ellipsoidal surfaces upon which light rays represented by ray A are incident. The incident and reflected rays in this part of the ellipsoidal surfaces are substantially equal so that magnification of the images from this part of the ellipsoid is substantially unity. At the same time, the extreme off-axis portions of the paraboloids 20 and 22 are eliminated so that there are no light rays such as ray E (see FIG. 2) generating aberrations in the image at point 34. Conversely, the paraboloidal mirrors are retained as the reflecting surfaces between points 36 and 42 and between 38 and 40. This is the preferable portion of the paraboloidal surfaces, without the aberrations that otherwise result from extreme off-axis rays. At the same time, the variable magnification effects that an ellipsoid would produce in this region are avoided. The combination paraboloid-ellipsoid mirror also yields a brighter image than the paraboloid alone because of the single reflection of the ellipsoidal surface (versus double reflection of the same rays in the paraboloid).

It will be apparent that by the combination of paraboloidal and ellipsoidal reflectors as disclosed, the geometries are combined in such a way as to retain their desirable effects to the exclusion of their corresponding undesirable effects. By doing this, the disadvantages of the individual ellipsoidal and paraboloidal mirror systems are largely avoided. In addition, the combination system disclosed herein gives benefits in size reduction where space is a problem.

The foregoing description of an embodiment of this invention is given by way of illustration and not of limitation. For example, while the terms "paraboloid" and "ellipsoid" have been used, and a surface of revolution contemplated in conjunction with a point source, the concept is also applicable to elliptical and parabolic geometries relative to a linear axis and linear light source. The concept and scope of the invention are limited only by the following claims and equivalents thereof which may occur to others skilled in the art.

What is claimed is:

1. A combination ellipsoidal-paraboloidal mirror including:
    an ellipsoidal reflector surface disposed about a pair of ellipsoidal focal points defining the principal axis of said mirror,
    a first paraboloidal reflector surface having a first paraboloidal focal point,
    a second paraboloidal reflector surface facing said first paraboloidal reflector surface and coaxial therewith and having a second paraboloidal focal point,
    said first and second paraboloidal focal points each corresponding to one of said pair of ellipsoidal focal points,
    the paraboloidal and ellipsoidal geometries of said reflector surfaces being coplanar in all planes which include both of said focal points,
    said reflector surfaces arranged so that said ellipsoidal reflector surface and said paraboloidal reflector surface together comprise the inner reflecting surface of said mirror.

2. A combination elliptical-parabolic mirror including:
    an elliptical reflector surface disposed about a pair of elliptical foci,
    a first parabolic reflector surface having a first parabolic focus,
    a second parabolic reflector surface facing said first parabolic reflector surface and having a second parabolic focus,
    said first and second parabolic foci each corresponding to one of said pair of elliptical foci,
    the parabolic and elliptical geometries of said reflector surfaces being coplanar,
    said reflector surfaces arranged so that said elliptical reflector surface and said parabolic reflector surfaces together comprise the inner reflecting surface of said mirror.

3. The reflector surface defined in claim 2 in which the defined geometry obtains in all planes parallel to said common plane, resulting in a cylindrical reflector surface.

* * * * *